Aug. 29, 1961  N. L. MUENCH ET AL  2,998,523
RADIATION LOGGING DEVICE
Filed July 3, 1958 2 Sheets-Sheet 1
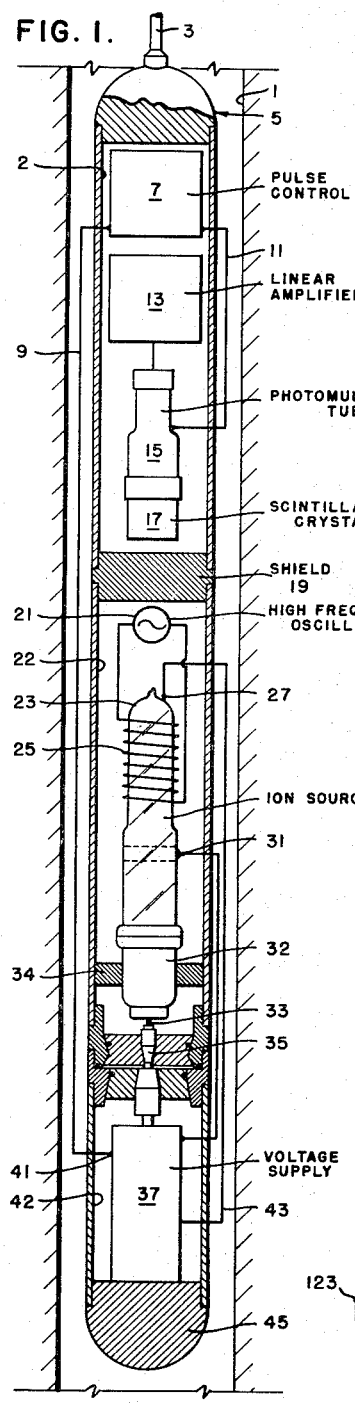
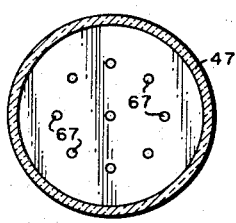
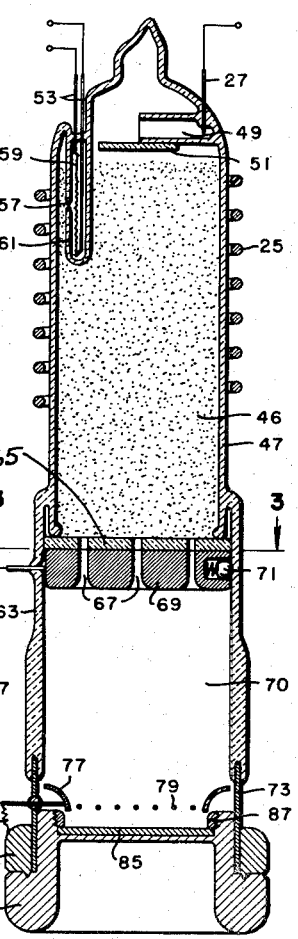
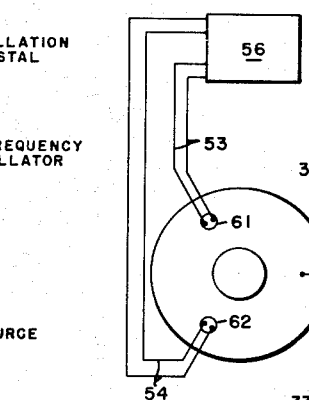
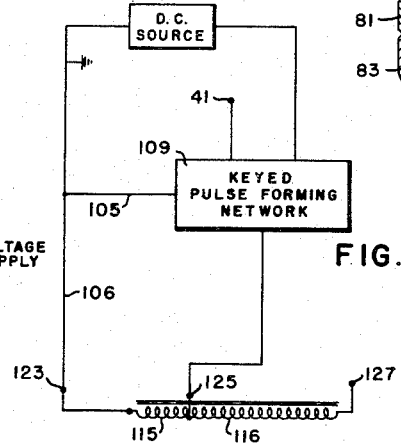
INVENTORS.
NILS L. MUENCH,
BELDON A. PETERS,
WILMER A. HOYER,
BY John B. Davidson
ATTORNEY.

EXTRACTION VOLTAGE

ACCELERATING VOLTAGE

United States Patent Office 2,998,523
Patented Aug. 29, 1961

2,998,523
RADIATION LOGGING DEVICE
Nils L. Muench and Beldon A. Peters, Houston, and Wilmer A. Hoyer, Bellaire, Tex., assignors to Jersey Production Research Company, Tulsa, Okla., a corporation of Delaware
Filed July 3, 1958, Ser. No. 746,520
5 Claims. (Cl. 250—84.5)

This invention relates generally to radiation logging of boreholes and more particularly to improved neutron generating apparatus particularly adapted for use in connection with neutron logging of boreholes.

In U.S. patent application Serial No. 652,801, by Nils L. Muench and H. R. Brannon, filed March 17, 1957, and assigned to the assignee of the present invention, there is described a method of borehole logging wherein discrete, timed bursts of neutrons are emitted into earth formations and the resulting gamma rays are subsequently detected. In connection with this and similar methods of borehole logging, it is important to generate strong bursts of neutrons at exactly controlled intervals of time. The generation of neutron bursts of any desired strength is no particular problem when the operation is done at the earth's surface where relatively large amounts of electrical power are readily available. However, when it is desired to perform such an operation in a borehole which may be drilled many thousands of feet into the earth, a considerably different situation prevails. All of the electrical power required for the operation must be transmitted through a very small diameter cable. In practice, a maximum of only 300 to 350 watts of power is available at the lower extremity of the logging cable.

A known type of particle accelerator that has been used in connection with borehole logging utilizes ion generating and accelerating apparatus for directing high-speed ions at a suitable target for emission of neutrons. The ions may be generated by subjecting deuterium gas to a radio frequency field, the deuterium ions being accelerated and directed at a tritium-containing target. Interaction of the high speed deuterium ions with the tritium in the target will bring about emission of neutrons from the target.

To prevent localized heating of the tritium target, it is necessary to diffuse or disperse the high speed ions as widely and as uniformly as possible over the surface of the target. It is also quite important to prevent damage to the ion generating equipment that may be brought about by electrons emitted from the target when the high-speed ions strike the target.

It is known that metal acts as a catalyst in the combination of monoatomic deuterium ions into diatomic ions. Diatomic ions are undesirable in a particle-accelerator neutron generator because of their greater weight and the consequent slower speed to which they can be accelerated as compared to monoatomic ions. To prevent monoatomic deuterium ions from combining to form diatomic ions, it is imperative that a minimum amount of metal be exposed in the ion generating compartment. Manifestly, this presents a problem since conductive metal electrodes are necessary to set up an electric field for the purpose of sweeping ions out of the compartment after they have been generated.

It has been found that the efficiency of production of deuterium ions is dependent upon the gas pressure in the ion generating compartment. Therefore, it is necessary to provide apparatus for maintaining the deuterium pressure within desired limits. In view of the fact that the apparatus almost inevitably will be subjected to rather rough treatment, it is imperative that the pressure regulating apparatus be as simple and yet as effective as possible.

In accordance with the teachings of the invention, a neutron generator is provided within an elongated envelope which is divided into an ion generating compartment and an ion accelerating compartment by a partition having a multiplicity of perforations therein. The ions may be generated within the ion generating compartment by subjecting deuterium gas to a radio frequency field. Ions are extracted from the ion generating compartment by producing an electric field therein for sweeping the ions through the perforations in the partition. High voltage pulses coupled between the partition and a target in the ion accelerating compartment accelerates ions passing through the perforations in the partition so that when they interact with tritium in the target, neutrons will be emitted from the target. In a preferred embodiment of the invention the partition comprises a ceramic or vitreous section facing the ion generating compartment and a metallic section facing the ion acceleration compartment. The electric fields for sweeping ions out of the ion generating compartment and for accelerating the ions in the acceleration compartment are pulsed in spaced time relationship, the electric field in the ion accelerating compartment lagging the electric field in the ion generating compartment. It has been found that the efficiency of the generator is enhanced when the time lag is of the order of one microsecond. Since metals act as catalysts for the transformation of monoatomic deuterium ions into diatomic deuterium ions, the electrode for sweeping ions from the ion generating compartment should not be in the ion generating compartment; in a preferred embodiment of the invention one of the electrodes is recessed from the ion generating compartment while the other is housed in the ion accelerating compartment.

A suppressor grid may be included in the ion accelerating compartment, adapted to be placed at a somewhat negative potential with respect to the target so as to return to the target electrons emitted by the target. In this this manner, damage to the walls of the generator and to the component parts thereof that may be caused by high speed electrons may be considerably diminished if not eliminated.

A more complete understanding of the invention may be had from the following description thereof when considered in connection with the accompanying drawings, wherein:

FIG. 1 is a schematic diagram of an embodiment of the invention suitable for use in connection with borehole logging;

FIG. 2 is a cross-sectional view of a neutron generator in accordance with the teachings of the invention;

FIG. 3 is a cross-sectional view of the apparatus of FIG. 2 taken along section 3—3;

FIG. 4 is a top view of the upper portion of the apparatus of FIG. 2 and additional pressure measuring equipment for use in connection with the apparatus;

Figure 6A:
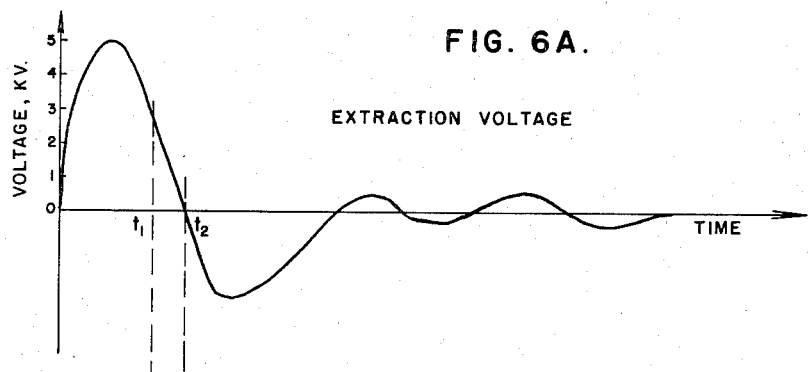
Figure 6B:
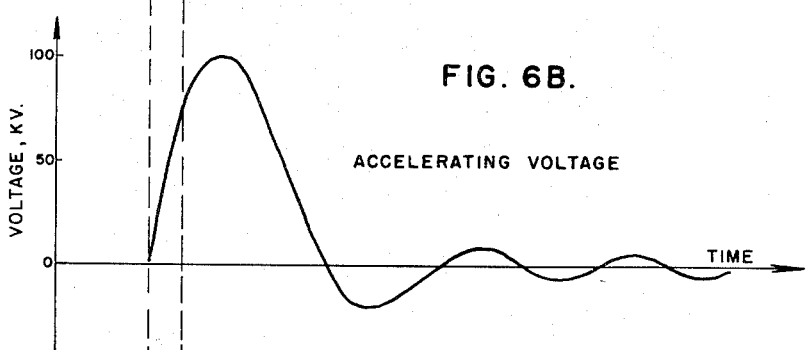
Figure 6C:
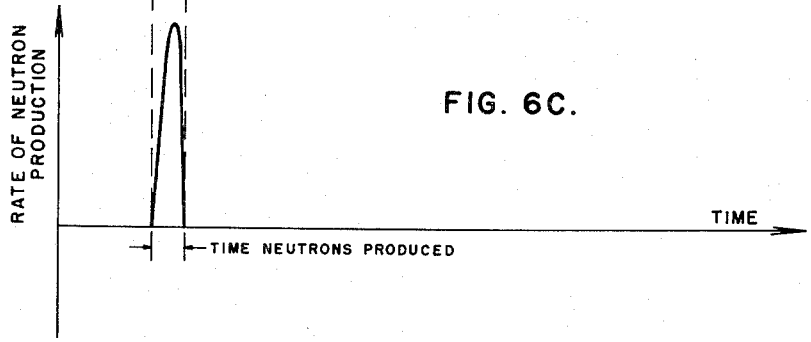

FIG. 5 is a schematic diagram of an electrical power supply shown in the embodiment of FIG. 1; and FIGS. 6A, 6B and 6C respectively show the waveform of the voltage pulse between electrodes 67 and 27, the voltage pulse between electrodes 69 and 85, and the simultaneous rate of neutron generation according to a preferred mode of operation of the embodiment of FIG. 1.

With reference to FIG. 1, there is shown a logging sonde 5 suspended in a borehole 1 by a suspension cable 3 which may be of the conventional type including a plurality of electrical conductors. The logging sonde may be divided into several compartments 2, 22, and 42 for the purpose of housing the various component parts of the apparatus. Compartments 2 and 22 are separated by a shield which will scatter, absorb or otherwise attenuate the neutron flux. Sections 22 and 42 preferably are separated by high-voltage electrical connecting means 35, illustrated more perspicuously in the copending U.S. patent application of Beldon A. Peters, Serial No. 746,368, Patent No. 2,898,414, for "Insulating High Voltage Leads Through Ends of Connected Components," filed July 3, 1958.

Compartment 2 houses radiation detecting equipment including a scintillation-type radioactivity detector controlled by pulse generator 7. The detector comprises a scintillation crystal 17 and a photomultiplier tube 15, and a linear amplifier 13 for amplifying the output indications of the photomultiplier tube and is coupled to pulse generator 7 by lead 11. The output signals from amplifier 13 may be transmitted to the earth's surface on one of the electrical conductors of cable 3. Radioactivity detecting apparatus of this nature is well known to the art and will not be further described herein.

Housed in compartment 22 is an ion source 23 which will be described in detail with reference to FIG. 2. Surrounding the upper portion of neutron generator 23 is a radio frequency coil coupled to a conventional high frequency oscillator 21. The function of coil 25 and oscillator 21 is to produce a radio frequency field in the neutron generator for the purpose of producing ions from deuterium gas within the generator. The neutron generator may be supported by support means 34 and by a high voltage coupling socket 32 and conductive pin 33. The neutron generator is electrically couped to a high voltage supply 37 housed in compartment 42.

For the purpose of insulating the component parts of neutron generator 23 and high voltage supply 37 from the sides and end sections of the sonde 5, sulfur hexafluoride gas is injected into the interior of compartments 22 and 42. In addition to being an excellent electrical insulator, sulfur hexafluoride gas is particularly adapted for use in connection with radioactivity logging of boreholes since it does not contain hydrocarbons which may interact with neutrons emitted by the neutron generator to produce false indications of hydrocarbons in surrounding earth formations. The sulfur hexafluoride within compartments 22 and 42 should be maintained at a pressure of between 20 and 200 pounds per square inch.

A schematic circuit diagram is shown in FIG. 5 for high voltage supply means 37. The high voltage supply may include a keyable pulse forming means 109, which pulse forming means may include a capacitor adapted to be charged through primary winding 115 from a D.C. source. A keyable switch, such as a thyratron, may be connected to discharge the capacitor through leads 105, 106, and winding 115 responsive to keying pulses at terminal 41, to provide high voltage pulses between terminals 123 and 127. The high voltage supply may be of conventional design. High-voltage terminal 127 is coupled to the ion target of the neutron generator through high-voltage coupling means 35, pin 33, and socket 32.

Primary terminal 125 and output terminal 123 are connected in the manner described below to other electrodes of the neutron generator. Control terminal 41 is coupled to pulse source 7 by lead 9. Pulses from source 7 periodically key the pulse forming network.

The details of the structure of the neutron generator are shown in FIGS. 2, 3, and 4. A glass envelope comprising upper section 47 and lower section 63, Kovar sealing section 73, and metallic electrode support 83 comprise a vacuum-type housing for the ionization chamber 46 and ion-accelerating chamber 70. A perforated partition including metallic electrode 69 and a Pyrex disc 65, separate the ion-generating chamber 46 from the ion-accelerating chamber 70. A suitable ionizable gas, such as deuterium, permeates the interior of the entire neutron housing. At the upper end of the ion generator is an electrode 27, which extends through the neutron generator glass housing and is sealed thereto, and which is isolated from the ion-generating chamber 46 by a tubular recess 49. To isolate the metallic electrode 27 from the monoatomic deuterium ions formed within ion-generating chamber 46, a Pyrex disc 51 is provided which is affixed to the lower edge of the tubular recess 49.

Pyrex disc 65 and metallic electrode 69 have formed therein a plurality of openings or perforations 67 through which ions from chamber 46 may enter chamber 70. A function of Pyrex disc 65 is to shield metallic electrode 69 from the monoatomic ions within chamber 46 so that the electrode will not act as a catalyst for a combination of the monoatomic ions into diatomic ions as described above. An additional function of the Pyrex disc is to aid in sweeping ions formed in ion-generating chamber 46 into chamber 70. If electrode 69 were exposed directly to chamber 46, most of the lines of force in the electric field produced between electrodes 27 and 69 would terminate on the upper face of electrode 69 although some would terminate on the target electrode 85. Most of the ions formed within chamber 46 would strike the upper face of electrode 69. Manifestly only a small fraction of the ions would enter chamber 70. The addition of the perforated Pyrex disc 65 substantially increases the fraction of the ion beam which passes through the perforations of electrode 69. High speed ions initially accelerated by the electric field between electrodes 27 and 69 will be swept through the perforations in electrode 69 into chamber 70 where the intense electric field between electrode 69 and target 85 will draw the ions to target 85.

Ion target 85 is secured within bottom electrode 83 by an annular ring 87 which threadedly engages electrode 83. Target 85 may be formed of zirconium, or other suitable material, which is hydrided in a well-known manner with tritium or other material with which the ions to be directed at the target will interact to emit neutrons. A conductive annular member 81 is provided to seal the Kovar member 73 against the bottom electrode 83. A terminal 33a, to which high-voltage terminal 127 is connected by member 32, pin 33 and coupling device 35, is electrically connected to conductive ring 81 and bottom electrode 83 by a voltage-dropping resistor 75. The resistor 75 may have a resistance of the order of $10^4$ ohms, sufficient to insure a voltage drop of about 200 volts thereacross. Terminal 33a is electrically connected to a suppressor grid 79 by a lead extending through the Kovar seal 73. Suppressor grid 79 is supported by suitable supporting means 77.

Electrical terminal 31 is connected to output terminal 125 of the power supply shown in FIG. 5. Terminal 31 is connected to an electrical lead which, in conjunction with an identation 71 in the wall of glass housing section 63 and a suitable spring and ball means within a recess in electrode 69, supports electrode 69 and Pyrex disc 65. Pyrex disc 65 is additionally held in place by the lower extremity of glass housing section 47.

For most efficient production of ions by a radio frequency field, the pressure of the deuterium gas must be held within certain limits. Preferably, the pressure should be between 1 and 20 microns. While any suitable means may be used for this purpose, the means shown in the drawings is preferred. A pair of annular, downwardly-extending chambers 61 and 62 are formed in the wall of the upper section of glass envelope 47. Within chambers 61 and 62 is supported a pair of tungsten filaments, one of which is designated by the reference numeral 59. Surrounding the tungsten filament in chamber 62 is a spirally wound zirconium wire. The filaments within chambers 61 and 62 are connected by leads 53 and 54 to a control means 56 such as two other legs of a Wheatstone bridge circuit, a power supply therefor, and a suitable measuring means, The chambers 61 and 62 may be evacuated of deuterium gas through opening 57 along with chamber 46 until, with a suitable current flowing through the tungsten filaments within chambers 61 and 62, the desired pressure is attained. If, for some reason such as emission (or adsorption) of gas from the walls of the ionization chamber, the pressure within the chamber 46 should increase (or decrease), the amount of heat that may be conducted away from filament 59 will also be increased so as to cause an unbalance in the Wheatstone bridge. When the bridge is again balanced, the current through the tungsten filament heating the zirconium wire will be decreased (or increased) so that the zirconium may adsorb (or emit) additional deuterium. It has been found that with this apparatus, the pressure within the neutron generator thus may be very exactly regulated.

The operation shown in the device of FIGS. 2, 3, and 4 is as follows: Assume that high frequency oscillator 21 is energizing coil 25 to produce deuterium ions within chamber 46. The deuterium ions will be randomly dispersed throughout enclosure 46 since there is no electric field within the chamber to direct the ions in any given direction. Assume now that a voltage pulse is applied between electrodes 27 and 69, and that a microsecond after initiation of the voltage pulse, a second voltage pulse is applied between electrodes 69 and 83. Initially, the ions within chamber 46 will be swept downwardly and will tend to accumulate near the Pyrex disc 65 at the lower end of chamber 46. When the second voltage pulse is applied between electrodes 69 and 83, the ions will be swept out of chamber 46 into chamber 70 through apertures 67 and then downwardly through chamber 70 to strike target 85. Interaction of the deuterium ions with the tritium in target 85 will produce neutrons and will also produce secondary electrons which will be ejected upwardly from target 85. The neutrons will pass through the Pyrex walls of chamber 70 and through the walls of chamber 22 into the surrounding earth formations. Interaction of the neutrons with the earth formations will produce characteristic secondary radiation that will be detected by the scintillation detector, amplified by amplifier 13 and transmitted to the earth's surface through cable 3.

Secondary electrons emitted by target 85 will be returned to the target by virtue of the voltage difference between target 85 and suppressor grid 79. Some electrons will pass through the suppressor grid but these will be sufficiently few in number to cause no appreciable damage to the components of the neutron generator. An advantage of delaying the voltage pulse applied between electrodes 69 and 85 relative to the voltage pulse applied between electrodes 69 and 27 is that ions will collect in the lower end of chamber 46 as described above. Since the amount of electrical power available for producing ions is necessarily limited, it is desirable to have the ions cluster as much as possible to produce sharp, strong bursts of neutrons when they strike target 85. If the pulses are applied simultaneously to the electrodes, the ions will be so dispersed as to be swept through the aperture 67 in more or less elongated streams, and the neutron bursts will not be concentrated as will be the case when the pulses are in spaced time relationship. A second and more important advantage is that the duration of the neutron bursts may be controlled and may be made as short as desired by controlling the overlap between the time during which an extraction voltage pulse is applied between terminals 69 and 27 and the time during which an acceleration voltage pulse is applied between electrodes 69 and 85, as shown in FIGS. 6A, 6B and 6C. Ions will cease entering the acceleration gap at time $t_2$ (i.e., when electrode 69 swings negative with respect to electrode 27), so ions will be accelerated toward target 85 to produce neutrons only during the interval between time $t_1$ and time $t_2$. The desired time delay may be achieved by designing transformer 116 so that the voltage appearing between secondary terminal 127 and terminal 123 is delayed relative to the voltage applied to primary terminal 125 that produces the voltage at terminal 127.

The invention is not to be restricted to the specific structural details, arrangement of parts, or circuit connections herein set forth, as various modifications thereof may be made without departing from the spirit and scope of this invention.

What is claimed is:

1. A neutron generator for use with well logging apparatus comprising: an ion generator including an elongated enclosure having an electrically conductive partition defining an ionization chamber for an ionizable gas contained therewith and an accelerating gap for ions discharged from said ionization chamber; a plurality of apertures within said partition through which ions may be injected into said accelerating gap; means operatively associated with said ionization chamber for inducing a radio frequency field within said chamber to ionize the gas therewithin; an electrode within said chamber adapted, when a direct voltage source is coupled between said electrode and said conductive partition, to produce an electrical field between said electrode and said partition for sweeping said ions toward said partition; at the end of said accelerating gap opposite said partition, an electrical target for said ions adapted to emit neutrons when struck by said ions; and electrical pulse generating means coupled to said electrode, said conductive partition, and said target for applying voltage pulses in spaced time relationship between said electrode and said conductive partition and between said conductive partition and said target, with the leading edge of each voltage pulse applied between said electrode and said conductive partition lagging in time the leading edge of a given voltage pulse applied between said conductive partition and said target and with the trailing edge of said each voltage pulse lagging in time the leading edge of said given voltage pulse, each pulse being between 1 and 15 microseconds in duration.

2. A neutron generator for use with well logging apparatus comprising: an ion generator including an elongated enclosure having an electrically conductive partition defining an ionization chamber for an ionizable gas contained therewith and an accelerating gap for ions discharged from said ionization chamber; a plurality of apertures within said partition through which ions may be injected into said accelerating gap; means operatively associated with said ionization chamber for inducing a radio frequency field within said chamber to ionize the gas therewithin; an electrode within said chamber adapted, when a direct voltage source is coupled between said electrode and said conductive partition, to produce an electrical field between said electrode and said partition for sweeping said ions toward said partition; at the end of said accelerating gap opposite said partition, an electrical target for said ions adapted to emit neutrons when stuck by said ions; a suppressor grid positioned between said target and said partition for returning to said target electrons emitted from said target; a voltage dropping resistor connected between said suppressor grid and said target; and electrical pulse generating means coupled to said target through said resistor and to said electrode and said conductive partition, adapted to apply voltage pulses in spaced time relationship between said electrode and said conductive partition and between said conductive partition and said target, with the leading edge of each voltage pulse applied between said electrode and said conductive partition lagging in time the leading edge of a given voltage pulse applied between said conductive partition and said target and with the trailing edge of said each voltage pulse lagging in time the leading edge of said given voltage pulse, each pulse being between 1 and 15 microseconds in duration.

3. A neutron generator for use with well logging apparatus comprising: an ion generator including an elongated enclosure having an electrically conductive partition defining an ionization chamber for an ionizable gas contained therewith and an accelerating gap for ions discharged from said ionization chamber; a plurality of apertures within said partition through which ions may be injected into said accelerating gap; means operatively associated with said ionization chamber for inducing a radio frequency field within said chamber to ionize the gas therewithin; an electrode within said chamber adapted, when a direct voltage source is coupled between said electrode and said conductive partition, to produce an electrical field between said electrode and said partition for sweeping said ions toward said partition; at the end of said accelerating gap opposite said partition, an electrical target for said ions adapted to emit neutrons when struck by said ions; and electrical pulse generating means including a pulse transformer having a primary winding connected between said partition and said electrode and a secondary winding connected between said partition and said target adapted to apply voltage pulses in spaced time relationship between said electrode and said conductive partition and between said conductive partition and said target, with the leading edge of each voltage pulse applied between said electrode and said conductive partition lagging in time the leading edge of a given voltage pulse applied between said conductive partition and said target and with the trailing edge of said each voltage pulse lagging in time the leading edge of said given voltage pulse, each pulse being between 1 and 15 microseconds in duration, said pulse transformer having an inherent time delay between application of a voltage to said primary winding and appearance of a voltage at said secondary winding thereof.

4. A neutron generator comprising: an elongated enclosure; a perforated partition having a plurality of perforations therethrough, positioned to divide said enclosure into an ion generating chamber and an ion accelerating chamber; a gaseous medium within said enclosure; radio frequency field producing means operatively associated with said ion generating chamber adapted to ionize the gaseous medium in said ion generating chamber; a target positioned opposite said partition in said ion accelerating chamber, adapted to interact with accelerated ions to emit neutrons; means, including voltage pulse generating means, adapted to produce a first transient electric field within said ion generating chamber for ejecting ions through said perforations into said ion accelerating chamber, and further adapted to produce within said ion accelerating chamber a second transient electric field a predetermined time after appearance of said first transient electric field and before disappearance of said first transient electric field for accelerating the ions ejected into said accelerating chamber to a velocity sufficient to eject neutrons from said target when ions strike said target; at least one compartment within said ion generating chamber; port means in said at least one compartment adapted to permit fluid communication between said at least one compartment and the interior of said elongated enclosure; tungsten filament means in said at least one compartment adapted to absorb quantities of said gaseous medium as an inverse function of the temperature of said filament, and further adapted to vary in temperature as an inverse function of the gaseous pressure in said at least one compartment; and means electrically connected to said filament adapted to maintain constant the temperature of said filament by varying electrical current therethrough.

5. A neutron generator comprising: an elongated enclosure; a perforated partition having a plurality of perforations therethrough, positioned to divide said enclosure into an ion generating chamber and an ion accelerating chamber; a gaseous medium within said enclosure; radio frequency field producing means operatively associated with said ion generating chamber adapted to ionize the gaseous medium in said ion generating chamber; a target positioned opposite said partition in said ion accelerating chamber, adapted to interact with accelerated ions to emit neutrons; means, including voltage pulse generating means, adapted to produce a first transient electric field within said ion generating chamber for ejecting ions through said perforations into said ion accelerating chamber, and further adapted to produce within said ion accelerating chamber a second transient electric field a predetermined time after appearance of said first transient electric field and before disappearance of said first transient electric field for accelerating the ions ejected into said accelerating chamber to a velocity sufficient to eject neutrons from said target when ions strike said target; and means operatively associated with said elongated enclosure for maintaining constant the gas pressure in the elongated enclosure.

References Cited in the file of this patent

UNITED STATES PATENTS

| 2,712,081 | Fearon | June 28, 1955 |
| 2,735,019 | Dewan | Feb. 14, 1956 |
| 2,831,134 | Reifenscheweiler | Apr. 15, 1958 |
| 2,852,696 | Johnson | Sept. 16, 1958 |
| 2,856,532 | Martina | Oct. 14, 1958 |

FOREIGN PATENTS

| 724,441 | Great Britain | Feb. 23, 1955 |